United States Patent [11] 3,580,397

[72] Inventor Lee Triplett
 Salt Lake, Utah
[21] Appl. No. 750,289
[22] Filed Aug. 5, 1968
[45] Patented May 25, 1971
[73] Assignee Expando Products Company
 Magna, Utah

[54] UTILITY ROD AND MOUNTING CONSTRUCTION THEREFOR
 1 Claim, 5 Drawing Figs.
[52] U.S. Cl. ................................................ 211/105.4,
 248/264, 287/126
[51] Int. Cl. ....................................... A47h 1/08,
 A47h 1/10, F16b 2/00
[50] Field of Search .......................................... 211/105.6,
 105.4, 105.3, 182; 287/126, 124, 114; 85/70, 71;
 151/7; 248/214, 216, 300, 264

[56] References Cited
 UNITED STATES PATENTS
 2,214,177 9/1940 Raybould ................ 287/124X
 2,446,406 8/1948 Beyerle ................... 287/124X
 2,456,480 12/1948 Austin ..................... 287/126X
 3,333,873 8/1967 Triplett ................... 287/126X
 805,570 11/1905 Maldaner ................ 248/264
 1,296,289 3/1919 Hill .......................... 248/264

Primary Examiner—Ramon S. Britts
Attorney—M. Ralph Shaffer

ABSTRACT: The present invention relates to rod constructions and, more particularly, to a new and improved elongate rod construction wherein the apparatus disposed at each end thereof is easily secured to the rod and is provided with friction-lock means, both for rod retention and for exterior mount placement, such that the apparatus can be easily manipulated to accomplish selective securement of opposite ends of the rod structure to the mounting members employed. In the preferred embodiment of the invention the adjustment wheels or equivalent devices used at the rod ends may be employed, not only to friction-lock the compression sleeves of the rod construction to their mounts, but also to apply a thrusting force against the oppositely disposed mounting members such that the same are retained tightly against and in tight friction engagement with the wall surfaces with which they are associated.

PATENTED MAY 25 1971

3,580,397

INVENTOR
LEE TRIPLETT

BY M. Ralph Shaffer

HIS ATTORNEY

UTILITY ROD AND MOUNTING CONSTRUCTION THEREFOR

The present invention provides a new and improved tubular rod construction designed for mounting between two, mutually spaced, oppositely disposed supports, and, more particularly, to a new and improved tubular rod construction wherein friction-lock means is employed to secure the tubular rod in the construction to an associated mounting member to be affixed or otherwise related to support structure.

Accordingly, a principal object of the present invention is to provide a new and improved tubular rod construction.

A further object is to provide a tubular rod construction that can be selectively mounted, by friction-lock means, to oppositely disposed supports.

A further object is to provide a tubular rod construction certain end-fitting apparatus which accommodates friction-lock securement of the apparatus associated with the rod to an external mounting member.

An additional object is to provide a tubular rod construction wherein the end apparatus associated therewith is friction-locked both to the tubular rod retained and also, selectively, to a mounting member with which the rod is to be operatively associated.

An additional object is to provide in a tubular rod construction suitable apparatus in conjunction with a single threaded member, such apparatus being utilizable in connection with said single threaded member, not only to friction-lock the apparatus to the tubular rod employed, but also to friction-lock the apparatus to an external mounting member.

An additional object is to provide a utility rod construction which is easily mountable to and dismountable from mounting members to be associated with the oppositely facing walls or partitions.

An additional object is to provide suitable structure for friction-locking the ends of tubular rod construction in relation to an external support; the friction-lock construction includes a mounting member provided with an access slot and a central aperture wall the latter of which can be frictionally engaged by the friction-lock device of the apparatus so as to tightly retain the rod in position, yet allow selective removement therefrom.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
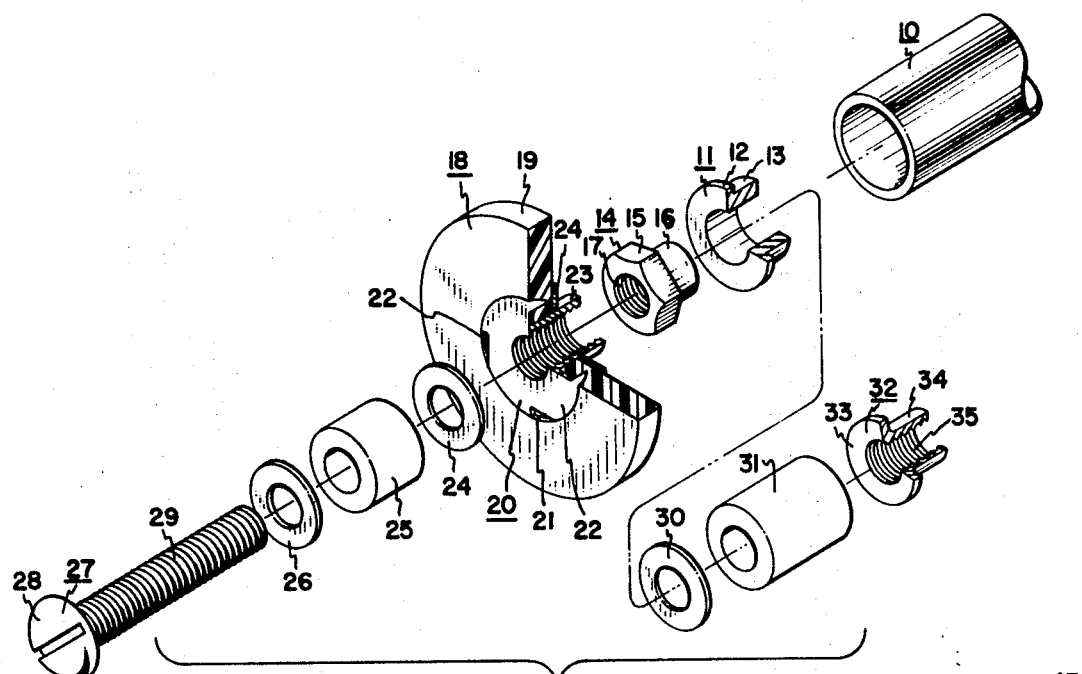
FIG. 1 is a fragmentary, partially sectioned, exploded view of a representative end of a tubular rod construction made in accordance with the principles of the present invention; it will be understood that the same, or substantially identical constructions will be disposed at opposite ends of the tubular rod employed in the construction.
Figure 2:
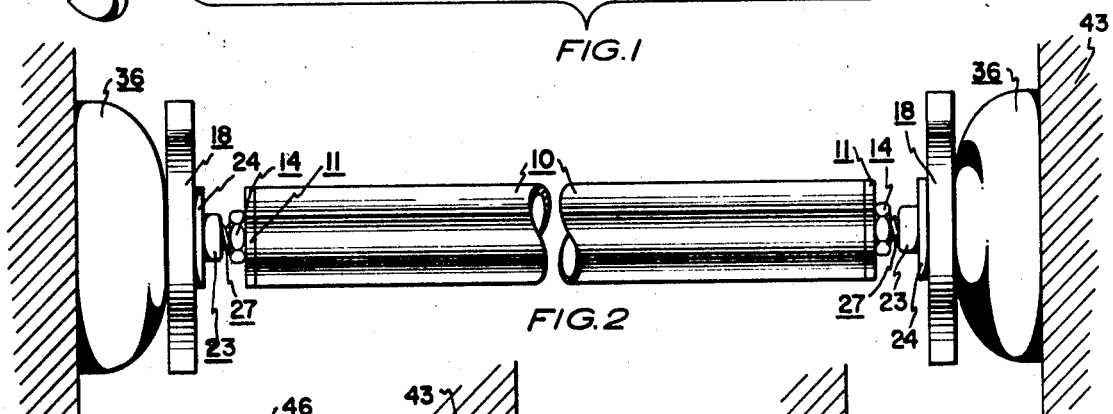
FIG. 2 is an elevation of a tubular rod construction incorporating the end apparatus, illustrated in FIG. 1, at opposite ends of the rod, for securing the rod to external mounting members.

In FIG. 1 tubular rod 10 is shown and receives flanged end-fitting 11 in a manner illustrated in FIG. 2. Flanged end-fitting 11 is provided with flange abutment 12, abutting the end of tubular rod 10, and a hollow boss 13 which is contiguous with the inner wall of tubular rod 10.

When assembled, the threaded end or shank 29 of bolt 27 will be disposed within the end of tubular rod 10, through the flanged end-fitting; to the right of the end-fitting (relative to the viewer) there will be mounted, on bolt 27, a friction-lock sleeve backed at opposite ends by washer 30 and nut 32. In general practice the outside diameter of friction-lock sleeve 31 will be slightly greater than the largest outside diameter of both washer 30 and nut 32. Nut 32 is a cylindrical-type nut having friction flange 33, a hollow threaded boss contiguous therewith at 34, and an interior threaded bore 35. Securement nut 14 is provided with a head 15 and hollow boss 16 which is threaded at 17 as shown. In assembly the securement nut 14 is also disposed upon threaded shank 29 of nut 27, and the boss thereof fits within the central aperture illustrated of the flanged end-fitting 11. Immediately prior to the insertion of the combination of members 11, 30, 31 and 32 within the end of tubular rod 10, there will be imposed a slight preload on friction-lock 31 so that the latter is slightly compressed and disposed in a manner to frictionally engage, slightly, the inner wall of tubular rod 10. Friction-lock sleeve 31 preferably is formed of a resilient, elastomeric material such as rubber, Neoprene, and so forth. It is axially compressible and radially expandable, as well as resilient, thereby permitting a member relieved of axial-compression distortion to be restored in a manner as to admit of substantial reuse of the article.

Thus, in assembly the threaded end or shank of bolt 27 will be disposed within the end of tubular rod 10, members 32, 31 and 38 will be mounted thereon to the right of flanged end-fitting 11, and securement nut 14 will be turned for sleeve compression, or bolt 27 turned such that nut 42 will automatically ride up the threaded shank 29 of bolt 27 so as to compress the friction-lock compression sleeve 31. This is accomplished by virtue of the fact of the increased frictional retention between the juncture surfaces of nut 32 and sleeve 31, the engagement of sleeve 31 with the interior wall of tubular rod 10, and the fact that the metal-to-metal, mutual surface friction between nut 32 and bolt 27 will be less than the frictional retentive force present between nut 32 and the anterior surface of friction-lock sleeve 31.

It will be understood that prior to the inclusion of members 11, 14, 30, 31 and 32 upon the threaded shank 29 of bolt 27, there will be preliminarily disposed upon bolt 27, proximate head 28 thereof, the combination of washer 26, friction-lock compression sleeve 25, bearing washer 24, and adjustment wheel 18. Adjustment wheel 18 is comprised of wheel member 19, preferably of a molded plastic material, an insert 20. The latter is provided with flange 22, depending securement tabs or lugs 21, and an internally threaded boss 23 proceeding through the wheel member 19 as indicated. A bearing 24, taking the form of a washer, may be glued or otherwise affixed to the adjustment wheel member 19. Thus, in assembly and with the washer 26, friction-lock sleeve 25, and washer 24 being disposed upon threaded shank 29 of bolt 27, the adjustment wheel 18 will be threaded onto shank 29 by the latter engaging the internal threads of boss 23. Next, the previously described parts such as member 11, 14, 30, 31 and 32 will be disposed in the manner hereinbefore described.

Figure 3:
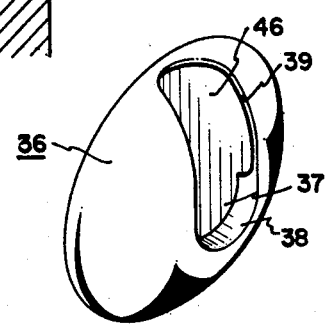
FIG. 3 is a perspective view of a representative mounting member employed in the invention.
Figure 4:
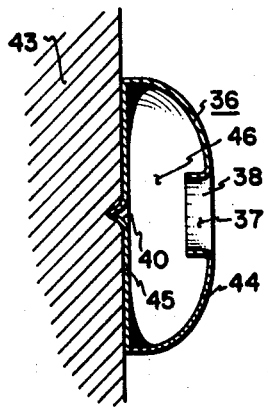
FIG. 4 illustrates one mounting member, similar to FIG. 3 when the member has means provided at its base to provide an insert that can be pressed into the wall or partition surface with which the mounting member is to be operatively associated.
Figure 5:
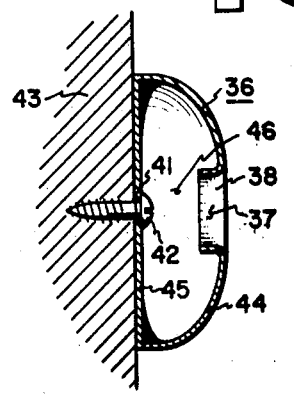
FIG. 5 is a vertical section of an alternate mounting member construction, wherein the latter is provided with a base aperture and securement means so as to provide for a fixed securement of the mounting member to a wall or other structure.

Once the securement nut 14 is tightened down as to compress friction-lock sleeve 31 and thus radially expand the same to tightly frictionally engage the inner wall of tubular rod 10 (see FIG. 2 as to the position of member 14), then the end-fitting including friction-lock sleeve 25 is immediately available for fitting into mounting member 36. See FIGS. 3, 4 and 5. As to mounting member 36, the same may be emplaced by a protuberance 40 as in FIG. 4 or by a screw 42, the mounting member being intended for securement to or at least placement at a wall or partition surface, relative to structural member 43. Mounting member 36 includes an outer shell 44 and a base 45 integral therewith. A hollow open area 48 exists between the base 45 and the outer shell 44 as indicated in FIG. 4. The outer shell 44 is provided with an admittance aperture 37, surrounded in part by an aperture wall 38. An access slot 39 is contiguous with admittance aperture 37 and selectively admits the selective insertion of the end of bolt 27, including friction-lock compression sleeve 25. It will be understood that sleeve 25 will be of the same general character as that of friction-lock sleeve 31, previously described.

In positioning the structure it is seen that the mounting members 36 are disposed in place on opposite walls or partitions as illustrated in FIG. 2. Then the opposite ends of the tubular construction, including tubular rod 10 and respective friction-lock sleeves 25, are inserted into and through access slot 39 and through the aperture area of aperture 37, this to abut and frictionally engage aperture wall 38. A subsequent tightening of the adjustment wheel through threading thereof to the left, as to the left-hand side in FIG. 2, and to the right, as to the right-hand side in FIG. 2, will operate to "expand" the rod construction, apply a tight, thrusting force against the associated mounting member, and compress the friction-lock sleeve 25 against washer 26. Such compression radially expands the friction sleeve so the latter tightly engages aperture wall 38 of aperture 37 of each of the mounts. Thus, a very tight securement is achieved as between the respective friction sleeves 25 and the aperture walls 38 of each of the mounting members 36.

When it is desired that the tubular construction be released from the mounting members 36, then all that is necessary is for the adjustment wheels to be threadedly advanced in the opposite direction, i.e. toward the respective opposite ends of tubular rod 10, so as to release the axially compression forces applied to the respective friction-lock sleeves; this allows the same to contract radially to release the tight friction engagement as between the friction-lock sleeves 25 and aperture walls 38.

It is thus seen that the present invention provides a new and improved tubular rod construction wherein the end constructions thereof admit of convenient mounting and assembly to the ends of the tubular rod itself, in addition to providing friction-lock means for engaging wall mounts. The device is easily fabricated and assembled, requires no soldering, pinning, or welding relative to the structure, especially as to tubular rod 10, and provides means, by means of a single bolt element structure, whereby plural friction-lock sleeves may be used at each end of tubular rod 10, one sleeve being employed to secure the coupling structure to the rod end, and the remaining sleeve being employed to secure the end of the rod to an external mounting member.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

1. In combination, a hollow tubular rod, plural securement apparatus respectively disposed at opposite ends of said rod, and a pair of mutually spaced mounting members having apertures respectively and retentively receiving said apparatus for supporting said rod therebetween, each of said securement apparatus comprising: an elongate threaded member having reaction means, an axially compressible, radially expandable, resilient, friction-lock sleeve disposed upon said threaded member and within the aperture of a respective one of said mounting member, adjustment means threaded upon said threaded member for selectively compressing said sleeve against said reaction means and thereby radially expand said sleeve to frictionally lockingly engage said mounting member operably associated therewith at said aperture, and means for securing said threaded member to that end of said rod at which it is so disposed, and wherein said adjustment means extends for manual adjustment beyond the circumference of said rod, said securing means comprises first, hollow, flanged bearing reaction means disposed upon said threaded member and fitted within and abutting the respective end of said rod, a second axially compressible, radially expandable resilient sleeve disposed upon said threaded member within said rod and backing said first, flanged bearing reaction means, and first nut means threaded onto said threaded member, disposed within said tube, and operatively backing said sleeve, and second, shouldered nut means thrustingly abutting and journaled within said first, flanged bearing reaction means, and threaded onto said threaded member between said adjustment means and said first, flanged bearing reaction means for tensioning said threaded member with respect to said second nut means to axially compress and thereby radially expand and lock said sleeve within said tube.